Patented Nov. 24, 1953

2,660,538

UNITED STATES PATENT OFFICE 2,660,538

LIQUID COMPOSITION COMPRISING A LOWER ALKOXY SILANE

Harold Garton Emblem, St. Helens, England, Clifford Shaw, Johannesburg, Transvaal, Union of South Africa, and William Edwin Langrish-Smith, Burwash Common, England; said Emblem assignor to said Shaw and said Langrish-Smith No Drawing. Application August 28, 1950, Serial No. 181,944. In Great Britain April 9, 1947

Section 1, Public Law 690, August 8, 1946
Patent expires April 9, 1967

10 Claims. (Cl. 106—287)

This invention relates to liquids comprising lower alkoxy silanes for use as coating compositions, e. g. for fire-proofing and other purposes, or as binders in the production of moulded articles, and this application is a continuation-in-part of our co-pending application Serial No. 764,578, now abandoned.

By the term silicyl esters as used in the specification is meant alkoxy, aryloxy and aralkoxy silanes. Tetraethoxy silane is a typical example of this class of compounds. Such compounds, as is well known, when treated with water are hydrolysed, and according to the amount of water used, one or more of the ester groups are converted into hydroxyl groups with the liberation of the respective alcohol or phenol. In the presence of sufficient water to hydrolyse the ester completely in the case of tetra alkoxy silanes, silicic acid and ultimately hydrated silica are formed. This reaction is accelerated by the presence of mineral acids.

If the quantity of water used for hydrolysis is equivalent to more than 1½ molecules of water to each molecule of silicyl ester, gelling and film formation takes place with or without accelerators. Unfortunately, such liquids are of very limited application because they are unstable, forming gels more or less rapidly (according to the hydroxyl content) during storage and thus becoming useless as coating compositions. If, on the other hand, water corresponding to less than 1½ molecules per molecule of silicyl ester is added, for example enough to replace only one of its alkoxy or aryloxy groups by a hydrolysed group, stability is maintained and the liquid may be stored without gelling for a long period of time because it does not decompose nor polymerise nor condense, but in this case it will not form films, and is thus again useless as a coating composition until further water is added.

It is essential in the commercial utilization of these silicyl esters as coating compositions or as binders in the production of mouldable compositions that after adding the necessary water for complete hydrolysis gelation should follow in a predetermined time so that the necessary manipulations may be carried out such as coating, or mixing and moulding, and when completed that the composition should set rapidly to a firm mass.

In the co-pending United States application Serial No. 637,289 of two of the present applicants and another, filed 26th December 1945, now U. S. Patent No. 2,550,923 corresponding to British Patent No. 575,752, a liquid composition capable of forming with water a film-forming coating is described and claimed, which composition comprises a silicyl ester as above defined and a proportion not more than about 5% by weight of piperidine or morpholine. It was found in adding the water necessary for complete hydrolysis that the composition set within a time interval dependent on the amount of piperidine present in the composition. It was suggested in the said co-pending application that other cyclic nitrogen compounds of a similar constitution to piperidine might act in a similar manner but no other cyclic nitrogen compounds of a similar constitution to piperidine have been found of practical value as hydrolysing agents and gelling accelerators.

It has now been found, and this discovery forms the basis of the present application, that organic bases which have the same order of basicity as piperidine and are free from heterocyclic nitrogen atoms, will act in an equivalent manner to piperidine. More particularly, it has been found that cyclohexylamine, dicyclohexylamine and ethanolamine are particularly suitable and have the advantage over piperidine of being cheaper; ethanolamine having also the advantage of acting as a mutual solvent of the ester and water.

In order to determine what organic bases are suitable for the purposes of the present invention, it has been found on investigating a number of organic bases the base strengths of which have been determined by Messrs. Hall and Sprinkle (J. Amer. Chem. Soc., 1932, p. 3469), that all bases having a pKa above 7 are suitable in greater or less degree, depending upon the base strength, for promoting the hydrolysis, film-forming properties (polymerisation) and gellation of silicyl esters as above defined. It will be seen from the following table that the only heterocyclic nitrogen base among those mentioned having a pKa value greater than 7 is piperidine. The actual figure for morpholine has not been found but it is of the same order as piperidine as will be seen from its behaviour as a hydrolysis and gellation accelerator:

| Base | pKa | |
|---|---|---|
| Piperidine | 11.1 | |
| Triethylamine | 10.8 | |
| Cyclohexylamine | 10.64 | act as condensing agents. |
| Ethanolamine | 9.4 | |
| Diethanolamine | 8.9 | |
| Triethanolamine | 7.8 | |
| Diethylaniline | 6.6 | |
| Pyridine | 5.3 | |
| o-aminophenol | 4.3 | do not act as condensing agents. |
| α-naphthylamine | 3.96 | |
| β-naphthylamine | 4.14 | |
| aniline | 4.6 | |

Dicyclohexylamine has been shown by Carswell and Morrill (Ind. Eng. Chem. 1937; 29; 1247) to be a stronger base than cyclohexylamine by about 0.1 pH unit.

In the above table it was found that triethanolamine and all the bases with the greater basic strength can be successfully employed as condensing agents whereas all those of a lower basic strength do not act as condensing agents. It was also found that hexamethylene tetramine did not act as a condensing agent.

According to the present invention, therefore, a liquid composition suitable for use as a binder when diluted with water comprises a silicyl ester as above defined and a small proportion of an organic base having a pKa value greater than 7 and containing no heterocyclic nitrogen atoms.

By the term "small proportion" as used above is meant a proportion, in the case of triethylamine, not exceeding 5% by weight, but a somewhat greater proportion of a weaker strength base may be desirable.

When adding the water necessary to complete the hydrolysis unless a mutual solvent for the water and silicon ester is present the latter being practically immiscible with water is likely to become unevenly dispersed in the composition and uneven hydrolysis result. Ethanolamine has the outstanding advantage of acting both as a condensing agent and mutual solvent for the water and silicon ester.

An important feature of the invention which provides a composition containing a constant proportion of water is a stable film-forming liquid composition comprising a silicyl ester having a hydroxyl content corresponding to that obtained by the addition of 1 to 1½ molecules of water per molecule of ester together with not more than 5% by weight of ethanolamine, cyclohexylamine or dicyclohexylamine. The advantage of such a composition is that the water to be added by the user in order to bring about the gelling will always be about the same.

The invention further includes the method of accelerating the formation of films from and the gelling of partially hydrolysed silicyl esters, which method comprises adding ethanolamine, cyclohexylamine or dicyclohexylamine, or equivalent organic base, to a silicyl ester at any stage prior to gellation and before or after the necessary water for the required partial hydrolysis. The amount of the base added will vary somewhat according to how fast the ultimate gellation of the product is desired after application of the coating to the article to be coated. It has been found that for most purposes an amount of 1 to 5% is suitable. With less than 1% the action is too feeble for most purposes and above 5% the rate of gellation is so fast, in the case of the higher strength bases, that insufficient time to carry out the requisite operations is allowed. An amount of 4% has been found especially suitable in the case of dicyclohexylamine.

Dicyclohexylamine has been found very suitable as a substitute for piperidine as a binder in the production of refractory articles, especially when using sillimanite as the refractory, though in order to obtain the best results it was found necessary to use 4% of dicyclohexylamine, where the best results with piperidine were obtained with an amount of 2%. In the case of dicyclohexylamine the mixtures were of a much more plastic (clay-like) nature than in the case of binders containing piperidine. A 4% dicyclohexylamine-ethyl silicate binder was found to give a very stiff mix initially and could not be collapsed into a mould by vibration. It could be plastered and moulded but during manipulation it became progressively softer and after further agitation it became fluid in a similar manner to the piperidine binder, but plasticity could be regained by adding more filler. High values of liquid to film ratio could be used without impairing the clay-like qualities of the mix; excess liquid draining away from the mass. Using binding liquids containing dicyclohexylamine there is less tendency to crack during the drying and ignition than with the corresponding piperidine mixtures.

We claim:

1. A liquid composition consisting of tetraethoxy silane and a small proportion of dicyclohexylamine not exceeding 5% of the weight of the ethoxy silane.

2. A film-forming liquid composition consisting of tetra-ethoxy silane containing 1 to 1½ molecules of water per molecule of ester together with a proportion of dicyclohexylamine not exceeding 5% of the weight of the tetra-ethoxy silane.

3. A liquid composition as claimed in claim 2, wherein the proportion of dicyclohexylamine is 4% by weight of the ester.

4. A liquid composition comprising a lower alkoxy silane characterized only by carbon-oxygen-silicon linkages, and a small proportion of an organic base having a pKa value greater than 7 and selected from the class consisting of alicyclic and saturated aliphatic organic bases having a carbon atom content of from 2 to 12 carbon atoms per molecule and having only carbon, hydrogen, oxygen and nitrogen atoms in the molecule.

5. A film-forming liquid composition comprising a lower alkoxy silane characterized only by carbon-oxygen-silicon linkages, which has been partially hydrolysed by the presence of from 1 to 1½ molecules of water per molecule of said alkoxy silane, together with a small proportion of an organic base having a pKa value greater than 7 and selected from the class consisting of alicyclic and saturated aliphatic organic bases having a carbon atom content of from 2 to 12 carbon atoms per molecule and having only carbon, hydrogen, oxygen and nitrogen atoms in the molecule.

6. A liquid composition comprising tetraethoxy silane and a small proportion of an organic base having a pKa value greater than 7, and selected from the class consisting of alicyclic and saturated aliphatic organic bases having a carbon atom content of from 2 to 12 carbon atoms per molecule and having only carbon, hydrogen, oxygen and nitrogen atoms in the molecule.

7. A liquid composition comprising ethyl silicate and a small proportion of an organic base having a pKa value greater than 7, and selected from the class consisting of alicyclic and saturated aliphatic organic bases having a carbon atom content of from 2 to 12 carbon atoms per molecule and having only carbon, hydrogen, oxygen and nitrogen atoms in the molecule.

8. A liquid composition as claimed in claim 7 wherein the said organic base is dicyclohexylamine.

9. A liquid composition as claimed in claim 7 wherein the said organic base is cyclohexylamine.

10. A liquid composition as claimed in claim 7 wherein the said organic base is ethanolamine.

HAROLD GARTON EMBLEM.
    CLIFFORD SHAW.
    WILLIAM EDWIN LANGRISH-SMITH.

References Cited in the file of this patent

FOREIGN PATENTS

| Number | Country | Date |
|---|---|---|
| 437,304 | Great Britain | Oct. 12, 1935 |
| 575,752 | Great Britain | Mar. 4, 1946 |
| 612,622 | Great Britain | Nov. 16, 1948 |